United States Patent [19]

Berry, Jr.

[11] 4,159,785
[45] Jul. 3, 1979

[54] METHOD FOR LOADING PARTICULATE MATTER IN A VESSEL

[75] Inventor: William M. Berry, Jr., Woodridge, Ill.

[73] Assignee: UOP Inc., Des Plaines, Ill.

[21] Appl. No.: 815,876

[22] Filed: Jul. 14, 1977

Related U.S. Application Data

[63] Continuation-in-part of Ser. No. 691,723, Jun. 1, 1976, abandoned.

[51] Int. Cl.² .............................................. B67D 5/08
[52] U.S. Cl. .................................................... 222/63
[58] Field of Search ...................... 222/52, 55, 63, 71, 222/76, 193; 318/326, 327, 463

[56] References Cited

U.S. PATENT DOCUMENTS 3,568,886  3/1971  Christmann ........................... 222/55

Primary Examiner—Stanley H. Tollberg
Attorney, Agent, or Firm—James R. Hoatson, Jr.; John G. Cutts, Jr.; William H. Page, II

[57] ABSTRACT

A method for loading particulate matter in a vessel. More particularly, a method for distributing particulate matter, at substantially a constant rate, uniformly across a given area to promote the dense packing of said particulate matter.

1 Claim, 1 Drawing Figure

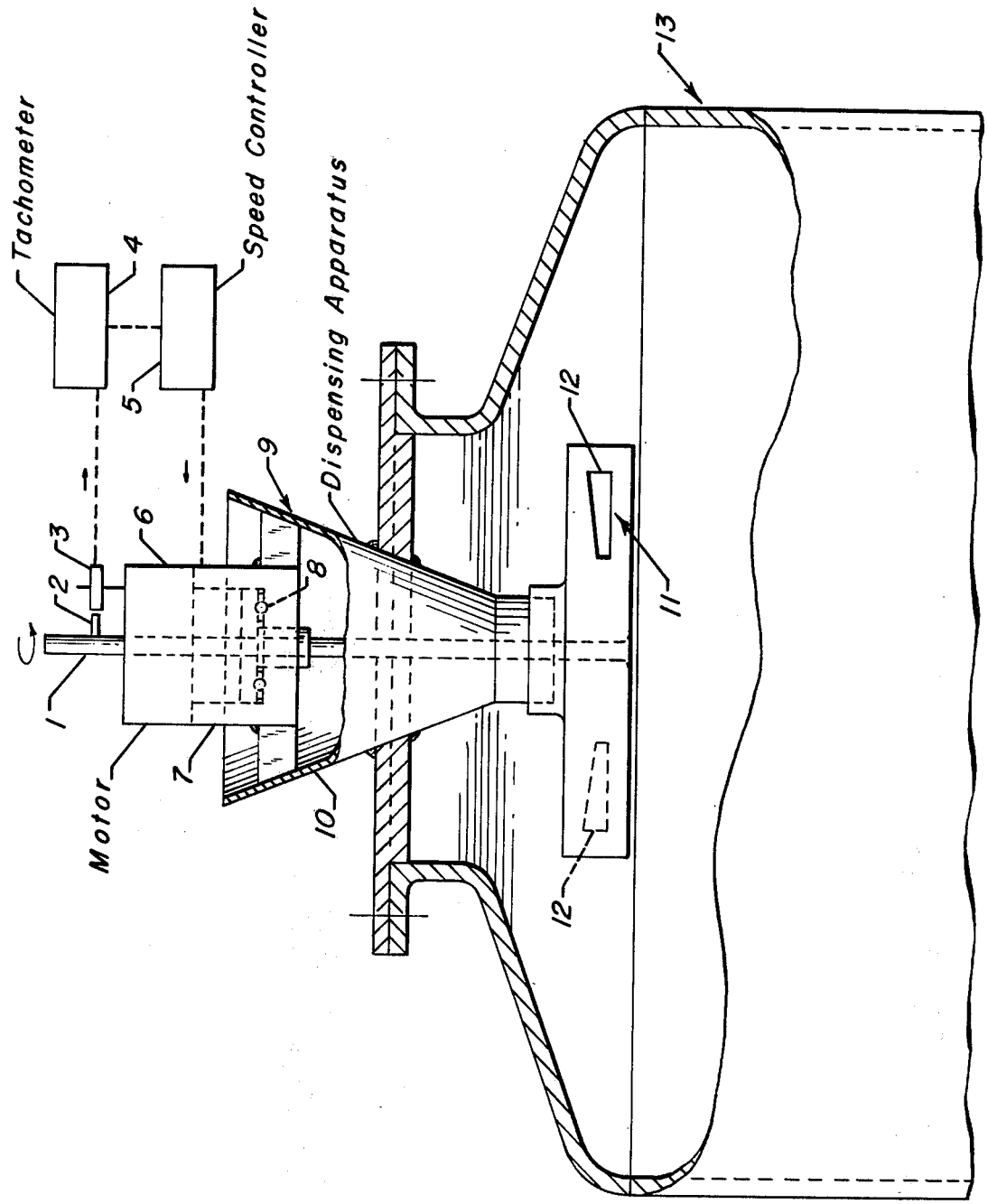

METHOD FOR LOADING PARTICULATE MATTER IN A VESSEL

CROSS REFERENCE TO RELATED APPLICATION

This application is a continuation-in-part of application Ser. No. 691,723, filed June 1, 1976 and now abandoned. All the teachings of which application are incorporated herein by reference thereto.

DESCRIPTION

This invention relates to a method for loading particulate matter in a vessel. More particularly, this invention relates to a method for distributing particulate matter, at substantially a constant rate, uniformly across a given area to promote the dense packing of said particulate matter.

The prior art has discovered the advantage of dense loading particulate matter into vessels. One advantage of dense loading is the ability to minimize storage space by eliminating excessive voids between the individual particles.

A suitable use for particulate dense loading is the placing of catalytic particles in a catalytic reaction zone vessel. Commercial catalytic reaction zone vessels or reactors vary in width or diameter from about 1 foot to about 15 feet or more, having a length of from about 5 feet to about 70 feet or more. Additional benefits recognized by dense loading reaction zones are the elimination of catalyst particle settling or "slumping" and localized hot spots during the exothermic reactions of the reactants. Any settling of the catalyst particles can change the overall volume of the catalyst bed thereby producing damage to equipment such as thermowells which have been inserted into the reactor for temperature measurements. In addition, the settling of catalyst can reduce the surface of the catalyst bed to a level whereby the thermowell is not in contact with the catalyst, thereby not allowing the reaction temperature to be monitored during the course of the reaction. Excessive voids in a catalyst bed cause poor gas, liquid, or gas-liquid distribution through the bed. The maldistribution often requires decreased through-put or increased temperatures, since the resulting catalyst utilization is low and product specifications may not be met. Particle settling may result in damage to other reactor internals, such as baskets, redistribution trays, catalyst supports and quench spargers.

The method of this invention is also suitable for loading adsorbents into vessels. Such adsorbents are often utilized in the chemical, petroleum and petrochemical industries for separation, purification and other uses.

The prior art is cognizant of devices utilized to dense load particulate matter into vessels. Many such devices utilize a rotating device to distribute the particulate matter in a downward free fall manner through a gaseous medium to the entire bed surface at substantially the same rate of fill. In order to maximize the results of dense bed loading, the speed of the rotating element of the particle loading device must be selected to account for such variable factors as the bed diameter, the particle diameter and density, the rotating element configuration and the falling height to the particulate bed. Once the required rotating element speed has been selected, it is most desirable that the selected speed of rotation be maintained throughout a specified period of the distribution procedure.

Heretofore, conventional particle dispensing apparati were known to have fluctuating rotational speed of their rotating element and since there is an optimal speed for the best loading or dispensing results, any fluctuation in the rotational speed resulted in inferior results. In some operating areas, such as petroleum refineries, one of the safest modes of driving the dispensing apparatus' rotating element is by means of a pneumatic motor which relies upon a constant pressure source of compressed air. Most compressed air sources are not designed to have a large volume capacity which would permit an unvarying pressure and therefore, some type of control system is required to maintain a constant speed with a pneumatic motor.

The rotating elements of particle loading devices may be suitably driven by a fluid operated driving means, viz., an air motor. Air motors are particularly preferred, however circulating oil motors are also envisioned. Compressed nitrogen may be a suitable fluid for the operation of a pneumatic motor. Regardless of the type of motor utilized to drive the rotating element of the particle dispensing apparatus, I have discovered a method to ensure that the preferred rotational speed of the rotating element is maintained throughout the particle dispersion procedure thereby promoting dense packing or loading.

In a broad embodiment, the present invention relates to a method for loading particulate matter in a vessel, at substantially a constant rate, uniformly across a given area from a rotatable discharge member, having dispensing apertures located on the trailing edge of said discharge member and a fluid operated driving means, said particulate matter deposited in a downflow relationship to said vessel at a rate of fill of said vessel of up to about twenty vertical inches per minute and at an average free fall distance of said particulate matter through a gaseous medium of at least about one foot after exit from said discharge member which comprises: (a) sensing the rotational speed of said rotatable discharge member; (b) generating a signal representative of said rotational speed; (c) comparing said generated signal with a predetermined signal representative of a desired discharge member speed; (d) generating a signal representative of the differential between said generated signal and said predetermined signal; and (e) transmitting the resulting differential signal to said fluid operated driving means to obtain the desired discharge member speed.

The drawing illustrates a typical particle dispensing apparatus positioned at the top of a vessel together with a schematic diagram of a control system. With reference now to the drawing, there is shown a vessel 13 upon which is mounted a particle dispensing apparatus 9. Dispensing apparatus 9 comprises a particle storage hopper 10 which communicates with a rotating discharge member 11 which member has at least one particle exit 12 located on the trailing edge of the discharge member 11 for the dispersion of the particles into the vessel 13. The rotating discharge member 11 is driven or rotated by means of a drive shaft 1 and a motor 6 which are positioned by means of a support housing 7 and bearing 8. The rotational speed of discharge member 11 is monitored by means of a shaft lobe 2 connected to shaft 1 which lobe 2 in cooperation with sensor 3 generates a signal which is transmitted to tachometer 4. An output signal is transmitted from tachometer 4 to speed controller 5 which in turn transmits an appropriate signal to motor 6 to maintain the desired rotational speed.

The invention as disclosed by the foregoing description is by way of illustration only and should not be regarded as limiting the scope of the invention which is defined by the claims which follow.

I claim as my invention:

1. A method for loading solid catalytic particulate matter to an elongated catalytic hydrocarbon conversion vessel, at a substantially constant rate of loading, uniformly across a given area of said vessel by discharge of said particles from a rotatable discharge member consisting of a fluid operated driving means having a variable drive speed and dispensing apertures situated on the trailing edge of said discharge member wherein said solid catalytic particulate matter is deposited in a downflow direction to said vessel at a rate of fill of said vessel of up to twenty vertical inches per minute and at an average free fall distance of said particulate matter through a gaseous medium of at least one foot after exit from said discharge member's dispensing aperture which comprises:

(a) sensing the rotational speed of said rotatable discharge member's drive means;

(b) generating a first signal representative of said drive mean's rotational speed;

(c) comparing said generated signal with a predetermined signal representative of the desired rotation speed of said discharge member's drive means;

(d) generating a second signal representative of the differential between said generated signal and said predetermined signal; and (e) transmitting said resultant second signal to said fluid operating driving means to vary the rotational speed of said discharge member to the desired rotational speed.

* * * * *